(12) United States Patent
Shimizu et al.

(10) Patent No.: US 8,430,794 B2
(45) Date of Patent: Apr. 30, 2013

(54) HYDRAULIC CONTROL APPARATUS OF AUTOMATIC TRANSMISSION

(75) Inventors: Tetsuya Shimizu, Anjo (JP); Kenichi Tsuchida, Aichi-ken (JP); Yoshimitsu Hyodo, Nishio (JP); Kazunori Ishikawa, Toyota (JP)

(73) Assignee: Aisin AW Co., Ltd., Aichi-ken (JP)

( * ) Notice: Subject to any disclaimer, the term of this patent is extended or adjusted under 35 U.S.C. 154(b) by 290 days.

(21) Appl. No.: 13/023,723

(22) Filed: Feb. 9, 2011

(65) Prior Publication Data

US 2011/0220823 A1    Sep. 15, 2011

(30) Foreign Application Priority Data

Mar. 12, 2010  (JP) ................................. 2010-056630

(51) Int. Cl.
*F16H 61/26*  (2006.01)
*F16J 13/06*  (2006.01)

(52) U.S. Cl.
USPC ............................ 477/130; 477/906; 475/114

(58) Field of Classification Search .................. 477/127, 477/130, 131, 143, 906, 907; 475/127, 128, 475/114
See application file for complete search history.

(56) References Cited

U.S. PATENT DOCUMENTS

| | | | | |
|---|---|---|---|---|
| 7,621,837 B2 * | 11/2009 | Sato et al. | ...................... | 475/127 |
| 7,628,729 B2 * | 12/2009 | Sato et al. | ...................... | 477/127 |
| 7,666,112 B2 * | 2/2010 | Long et al. | ...................... | 475/128 |
| 2005/0209048 A1 | 9/2005 | Morise et al. | | |
| 2009/0143180 A1 | 6/2009 | Shimizu et al. | | |
| 2010/0081545 A1* | 4/2010 | Shimizu et al. | ............... | 477/130 |
| 2010/0081546 A1* | 4/2010 | Yoshioka et al. | ............. | 477/131 |

FOREIGN PATENT DOCUMENTS

| | | |
|---|---|---|
| JP | 2005-265101 A | 9/2005 |
| JP | 2009-133435 A | 6/2009 |
| JP | 2009-150532 A | 7/2009 |
| JP | 2009-168214 A | 7/2009 |

OTHER PUBLICATIONS

International Search Report for corresponding International Patent Application No. PCT/JP2011/051794 mailed Apr. 19, 2011.

* cited by examiner

*Primary Examiner* — Roger Pang
(74) *Attorney, Agent, or Firm* — Sughrue Mion, PLLC

(57) ABSTRACT

A hydraulic control apparatus of an automatic transmission which can supply a hydraulic oil pressure to one or more hydraulic servos of frictional engagement elements at a failure time when a de-energized condition is attained. The apparatus includes a normally closed type first solenoid valve for generating the hydraulic oil pressure, and a normally open type second solenoid valve for outputting a first signal pressure for adjusting and controlling an oil pressure to a line pressure; a signal output device for outputting the line pressure or a modulator pressure. The line pressure is reduced to a certain pressure, as a second signal pressure at a normal time, and causes the second signal pressure not to be output at the failure time; and an oil pressure switching device switchable between a normal time position in which the hydraulic oil pressure from the first solenoid valve can be supplied to the hydraulic servo, and a failure time position in which the input line pressure is supplied to the hydraulic servo, is switched to the normal time position by the first signal pressure and second signal pressure, which are input opposed to each other, being input, and switched to the failure time position by the first signal pressure being input and the second signal pressure not being input.

4 Claims, 5 Drawing Sheets

FIG.2

|     | C1  | C2  | C3  | C4  | B1  | B2  | F1  |
|-----|-----|-----|-----|-----|-----|-----|-----|
| 1st | ●   |     |     |     |     | (●) | ●   |
| 2nd | ●   |     |     |     | ●   |     |     |
| 3rd | ●   |     | ●   |     |     |     |     |
| 4th | ●   |     |     | ●   |     |     |     |
| 5th | ●   | ●   |     |     |     |     |     |
| 6th |     | ●   |     | ●   |     |     |     |
| 7th |     | ●   | ●   |     |     |     |     |
| 8th |     | ●   |     |     | ●   |     |     |
| Rev |     |     | ●   |     |     | ●   |     |

(●) ENGINE BRAKING TIME

HYDRAULIC CONTROL APPARATUS OF AUTOMATIC TRANSMISSION

The disclosure of Japanese Patent Application No. 2010-056630 filed on Mar. 12, 2010, including the specification, drawings and abstract thereof, is incorporated herein by reference in its entirety.

BACKGROUND OF THE INVENTION

1. Field of the Invention

The present invention relates to a hydraulic control apparatus of an automatic transmission mounted in a vehicle or the like, and particularly, relates to a hydraulic control apparatus of an automatic transmission which, while enabling an achievement of a speed stage at a time of a failure causing a de-energization (a failure time), has resolved a problem which is likely to occur at a normal time due to the failure.

2. Description of the Related Art

In general, with a multi-stage automatic transmission mounted in a vehicle or the like, each speed stage is formed by controlling a rotation condition of each rotational element of a speed change gear mechanism using an engagement condition of a plurality of frictional engagement elements, and the engagement condition of the plurality of frictional engagement elements is controlled by an engagement pressure being electrically adjusted using a solenoid valve and supplied to a hydraulic servo of each frictional engagement element.

Meanwhile, with the heretofore described kind of automatic transmission, when a failure of no electricity being supplied to the solenoid valve, that is, a so-called solenoid all-off (hereafter referred to a "failure" as appropriate) condition, occurs, the heretofore described electrical speed change control using the solenoid valve is disenabled. It is conceivable that this kind of failure condition is caused by, for example, a shutdown of a controller (an ECU), or a disconnection or short circuit of a battery wiring.

For this reason, an automatic transmission is proposed which, when this kind of failure condition occurs while travelling (in a forward range) (when a failure occurs), continuously achieves a securement of a travelling performance by achieving two kinds of speed stage in accordance with a speed stage before the failure condition has occurred without using the electrical pressure adjustment control of the solenoid valve (refer to JP-A-2005-265101). That is, the automatic transmission is configured in such a way as to achieve a third forward speed stage when a failure occurs in a first forward speed stage to a fourth forward speed stage, and a fifth forward speed stage when a failure occurs in the fifth forward speed stage to a sixth forward speed stage, that is, it is configured in such a way as to secure a travelling performance in a low speed stage when a failure occurs while travelling at low speed, and secure a travelling performance in a high speed stage when a failure occurs while travelling at high speed. The automatic transmission is configured in such a way as to, for example, attain the third forward speed stage when a manual shift valve is operated to switch from a drive position to a neutral position and to the drive position again after a failure occurs, and also has a so-called limp home function of this configuration enabling the vehicle to start moving again.

SUMMARY OF THE INVENTION

Meanwhile, the heretofore described automatic transmission of JP-A-2005-265101 is configured so that a sequence valve 4500 (refer to FIG. 4 of JP-A-2005-265101) for forming a gear stage for the limp home function, being disposed in the right half position in the drawing at a normal time, switches to the left half position in the drawing at a failure time. Then, the sequence valve 4500, by a pressure adjusted by an SL1 or an SL2 being input from an SL port (S) 4544, is maintained in the right half position.

However, the pressure adjusted by the SL1 is low, for example, immediately after a switching from an N (neutral) range to a D (drive) range, or immediately after a return from an N control (a neutral control). In this case, when an SLT pressure is high, the sequence valve 4500 can be instantaneously switched to the left half position in the drawing, that is, a failure time position, even at the normal time. In this kind of case, there is a danger that a line pressure is supplied directly to a clutch, and an engagement shock occurs. In order to resolve this kind of problem, for example, it is also possible to impose a restriction on the SLT pressure, but there is a problem in that this makes the control complex.

Therefore, the invention has an object of providing a hydraulic control apparatus of an automatic transmission with which, while it is possible, when a failure causing a de-energization occurs while travelling, to achieve an appropriate speed stage in accordance with a speed stage at the point when the failure occurs, it is possible to resolve the heretofore described problem with a simple configuration without carrying out a complex control.

According to the invention of first aspect, as an oil pressure switching device is switched to the normal time position by a second signal pressure (line pressure or modulator pressure) at the normal time, for example, even when a first signal pressure (for example, an SLT pressure) increases suddenly, it is possible to reliably maintain the oil pressure switching device in the normal time position. Meanwhile, as the second signal pressure is not input at the failure time, the oil pressure switching device is swiftly switched to the failure time position. These can be achieved without involving a complex control.

According to the invention of second aspect, on a third signal pressure based on a hydraulic oil pressure being input into a first relay valve at the normal time, the first relay valve is switched to a supply position, and can output the supplied line pressure or modulator pressure as the second signal pressure. Meanwhile, as the third signal pressure based on the hydraulic oil pressure is not input into the first relay valve at the failure time, the first relay valve is switched to the non-supply position, and does not output the second signal pressure. As opposed to this, at the normal time, even when the first relay valve is switched to the non-supply position, by a third solenoid valve being turned on, a fourth signal pressure is input into a second relay valve, the line pressure or modulator pressure supplied to the second relay valve is input into the first relay valve, and the first relay valve can output it as the second signal pressure. That is, the first relay valve, as well as reliably stopping the output of the second signal pressure at the failure time, at the normal time, can output the second signal pressure not only when the third signal pressure is input, but also when the third signal pressure is not sufficient, by the third solenoid valve being turned on in the latter case.

According to the invention of third aspect, with the first relay valve, when the third signal pressure is equal to or less than a predetermined value, there is a danger that the first relay valve is switched to the non-supply position, and cannot output the line pressure or modulator pressure, supplied to itself, as the second signal pressure, but even in this case, when it is determined by a determination unit that the third signal pressure is equal to or less than the predetermined value, the third solenoid valve is turned on by a control unit, and the fourth signal pressure is input into the second relay valve. Because of this, the line pressure or modulator pressure supplied to the second relay valve is input into the first relay valve, and furthermore, is output from the first relay valve as the second signal pressure. That is, at the normal time, even when the third signal pressure reaches the predetermined value or less, it is possible to output the second signal pressure. Furthermore, as the third solenoid valve is turned on only when the third signal pressure is equal to or less than the predetermined value, it is possible to increase mileage.

According to the invention of fourth aspect, the oil pressure switching valve, in the normal time position, can supply a hydraulic oil pressure from a first solenoid valve to a hydraulic servo of a first frictional engagement element, and supply a hydraulic oil pressure from a second solenoid valve to a hydraulic servo of a second frictional engagement element, while, in the failure time position, it can supply the line pressure input from a low speed stage oil passage to the hydraulic servo of the first frictional engagement element, and supply the line pressure input from a high speed stage oil passage to the hydraulic servo of the second frictional engagement element.

BRIEF DESCRIPTION OF THE DRAWINGS

FIG. 2 is an operational table of a solenoid valve, and an engagement table of a clutch and a brake, of the automatic transmission;

DETAILED DESCRIPTION OF THE EMBODIMENTS

First Embodiment

Figure 1:
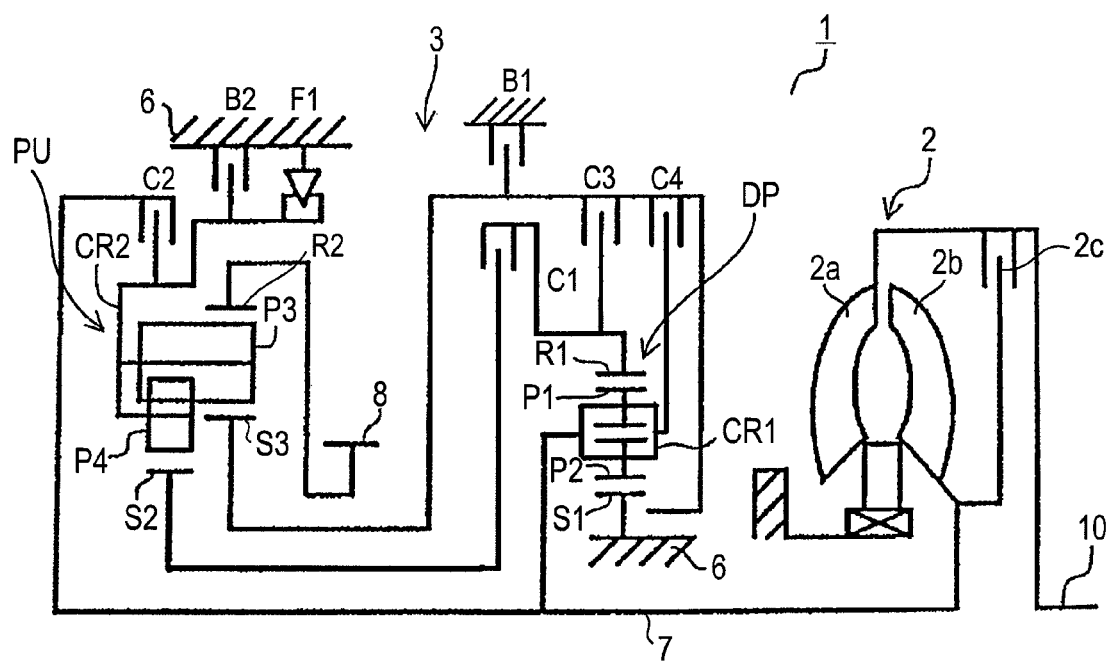
FIG. 1 is a skeleton diagram showing an automatic transmission according to the invention.

Hereafter, a description will be given, following FIGS. 1 to 4, of a first embodiment according to the invention.

Outline Configuration of Automatic Transmission

Firstly, a description will be given, following FIG. 1, of an outline configuration of an automatic transmission 1 to which the invention can be applied. As shown in the skeleton diagram of FIG. 1, the automatic transmission 1 suitable for use in, for example, an FF type (front engine, front drive) vehicle, having an input shaft 10 of the automatic transmission which can be connected to an engine (not shown), includes a torque converter 2 and an automatic transmission mechanism 3 centered on an axial direction of the input shaft 10.

The torque converter 2 has a pump impeller 2a connected to the input shaft 10 of the automatic transmission 1 and a turbine runner 2b to which a rotation of the pump impeller 2a is transmitted via a hydraulic fluid, and the turbine runner 2b is connected to an input shaft 7 of the automatic transmission mechanism 3 disposed coaxially with the input shaft 10. Also, a lock-up clutch 2c is included in the torque converter 2 and, on the lock-up clutch 2c being engaged, a rotation of the input shaft 10 of the automatic transmission 1 is directly transmitted to the input shaft 7 of the automatic transmission mechanism 3.

The automatic transmission mechanism 3 is provided with a reduction planetary gear (hereafter referred to simply as a "planetary gear") DP, which decelerates the rotation of the input shaft 7, on the input shaft 7, and with a planetary gear unit PU on the back side thereof (on the left side in FIG. 1), and these have clutches C1 to C4 and brakes B1 and B2 as a plurality of frictional engagement elements.

The planetary gear DP, including a first sun gear S1, a first carrier CR1, and a first ring gear R1, as shown in FIG. 1, is a so-called double pinion planetary gear having in the first carrier CR1 a pinion P2 which meshes with the first sun gear S1, and a pinion P1 which meshes with the first ring gear R1, in a form in which the pinions P2 and P1 mesh with each other.

Meanwhile, the planetary gear unit PU, having a second sun gear S2, a third sun gear S3, a second carrier CR2, and a second ring gear R2 as four rotational elements, is a so-called Ravigneaux type planetary gear having in the second carrier CR2 a long pinion P3 which meshes with the third sun gear S3 and second ring gear R2, and a short pinion P4 which meshes with the second sun gear S2 and long pinion P3, in a form in which the pinions P3 and P4 mesh with each other.

The first sun gear S1 of the planetary gear DP is fixed in rotation with respect to a transmission case 6. Also, the carrier CR1, as well as being connected to the input shaft 7 and arranged so that a rotation thereof is the same as the rotation of the input shaft 7 (hereafter referred to as an "input rotation"), is connected to the fourth clutch C4 (a first clutch). Furthermore, the first ring gear R1, as well as attaining a decelerated rotation wherein the input rotation is decelerated by the fixed first sun gear S1 and the input rotating first carrier CR1, is connected to the first clutch C1 and third clutch C3 (a second clutch).

The third sun gear S3 of the planetary gear unit PU, as well as being connected to the first brake B1 and arranged so as to be fixable to the transmission case 6, is connected to the fourth clutch C4 and third clutch C3, and arranged so that the input rotation of the first carrier CR1, and the decelerated rotation of the first ring gear R1, can be input via the fourth clutch C4 and third clutch C3 respectively. Also, the second sun gear S2, being connected to the first clutch C1, is arranged so that the decelerated rotation of the first ring gear R1 can be input.

Furthermore, the second carrier CR2, being connected to a second clutch C2 into which the rotation of the input shaft 7 is input, is arranged so that the input rotation can be input via the second clutch C2. Also, the second carrier CR2, being connected to a one-way clutch F1 and the second brake B2, is arranged so that, as well as a rotation being limited in one direction with respect to the transmission case 6 via the one-way clutch F1, a rotation is fixable via the second brake B2. Then, the second ring gear R2 is connected to a counter gear 8 rotatably supported on a center support member fixed to the transmission case 6. The counter gear 8 is connected to a drive wheel via an unshown counter shaft and differential device.

The automatic transmission 1 of the heretofore described configuration, by the clutches C1 to C4, brakes B1 and B2, and one-way clutch F1 shown in the skeleton diagram of FIG. 1 being engaged and disengaged, as shown in the engagement table of FIG. 2, achieves a first forward speed stage (1st) to an eighth forward speed stage (8th) and a reverse stage (Rev). Of the first forward speed stage to eighth forward speed stage, the first forward speed stage (1st) to the fourth forward speed stage (4th) correspond to a "low speed stage", and the fifth forward speed stage (5th) to the eighth forward speed stage (8th) correspond to a "high speed stage".

Outline Configuration of Hydraulic Control Apparatus

Continuing, a description will be given, following FIGS. 3 and 4, of a hydraulic control apparatus 5 of the automatic transmission according to the invention. In the hydraulic circuit diagram of FIG. 3 and a control device (an ECU) which controls the hydraulic control apparatus 5, only one portion relating to the invention is illustrated. Firstly, a rough description will be given of unshown portions of the hydraulic control apparatus 5 which generate a line pressure, a secondary pressure, a modulator pressure, a range pressure, and the like. These line pressure, secondary pressure, modulator pressure, and range pressure generation portions, as they are the same as those of a hydraulic control apparatus of a common automatic transmission and well known, will be described in brief. In the embodiment, the "line pressure", being used in the broad sense, is taken to include a forward range pressure and reverse range pressure too.

The hydraulic control apparatus 5, including, for example, an unshown oil pump, manual shift valve, primary regulator valve, secondary regulator valve, solenoid modulator valve, and linear solenoid valve SLT (second solenoid valve), causes an oil pressure to be generated, for example, in a form in which the oil pump rotation drivably connected to the pump impeller 2a of the torque converter 2 sucks oil from an unshown oil pan via a strainer, when the engine is started, by being driven in conjunction with a rotation of the engine.

The oil pressure generated by the oil pump is adjusted and controlled to a line pressure $P_L$ while being subjected to a discharge adjustment by the primary regulator valve based on a signal pressure (a first signal pressure) $P_{SLT}$ of the linear solenoid valve SLT which is adjusted and output in accordance with a throttle opening. The line pressure $P_L$ is supplied to the manual shift valve (a range switching valve), the solenoid modulator valve, a linear solenoid valve SLC3, to be described in detail hereafter, and the like. The line pressure $P_L$ supplied to the solenoid modulator valve, of these valves, is adjusted (reduced) to a modulator pressure $P_{MOD}$ which is made an approximately constant pressure by the valve, and the modulator pressure $P_{MOD}$ is supplied as a source pressure of the linear solenoid valve SLT, a solenoid valve S1, to be described in detail hereafter, and the like.

The pressure discharged from the primary regulator valve is adjusted to a secondary pressure $P_{SEC}$ while being further subjected to the discharge adjustment by, for example, the secondary regulator valve, and the secondary pressure $P_{SEC}$, as well as being supplied to, for example, a lubricating oil passage and an oil cooler, is also supplied to the torque converter 2, and is also used in controlling the lock-up clutch 2c.

Meanwhile, the manual shift valve (not shown), having a spool which is mechanically (or electrically) driven with a shift lever provided by a driver seat (not shown), sets an output condition or non-output condition (a drain) of the input line pressure $P_L$ by a position of the spool being switched in accordance with a shift range (for example, P, R, N, or D) selected with the shift lever.

Specifically, on the D (drive) range being selected based on an operation of the shift lever, an input port, into which the line pressure $P_L$ is input, and a forward range pressure output port communicate based on a position of the spool, and the line pressure $P_L$ is output from the forward range pressure output port as the forward range pressure (a D range pressure) $P_D$. When the R (reverse) range is selected based on an operation of the shift lever, the input port and a reverse range pressure output port (an R range pressure output port) communicate based on a position of the spool, and the line pressure $P_L$ is output from the reverse range pressure output port as a reverse range pressure (an R range pressure) $P_{REV}$. Also, when the P (parking) range and N (neutral) range are selected based on an operation of the shift lever, as well as the input port and the forward range pressure output port and reverse range pressure output port being disconnected by the spool, the forward range pressure output port and reverse range pressure output port are caused to communicate with a drain port, that is, the non-output condition is attained in which the D range pressure $P_D$ and R range pressure $P_{REV}$ are drained (discharged).

Figure 4:
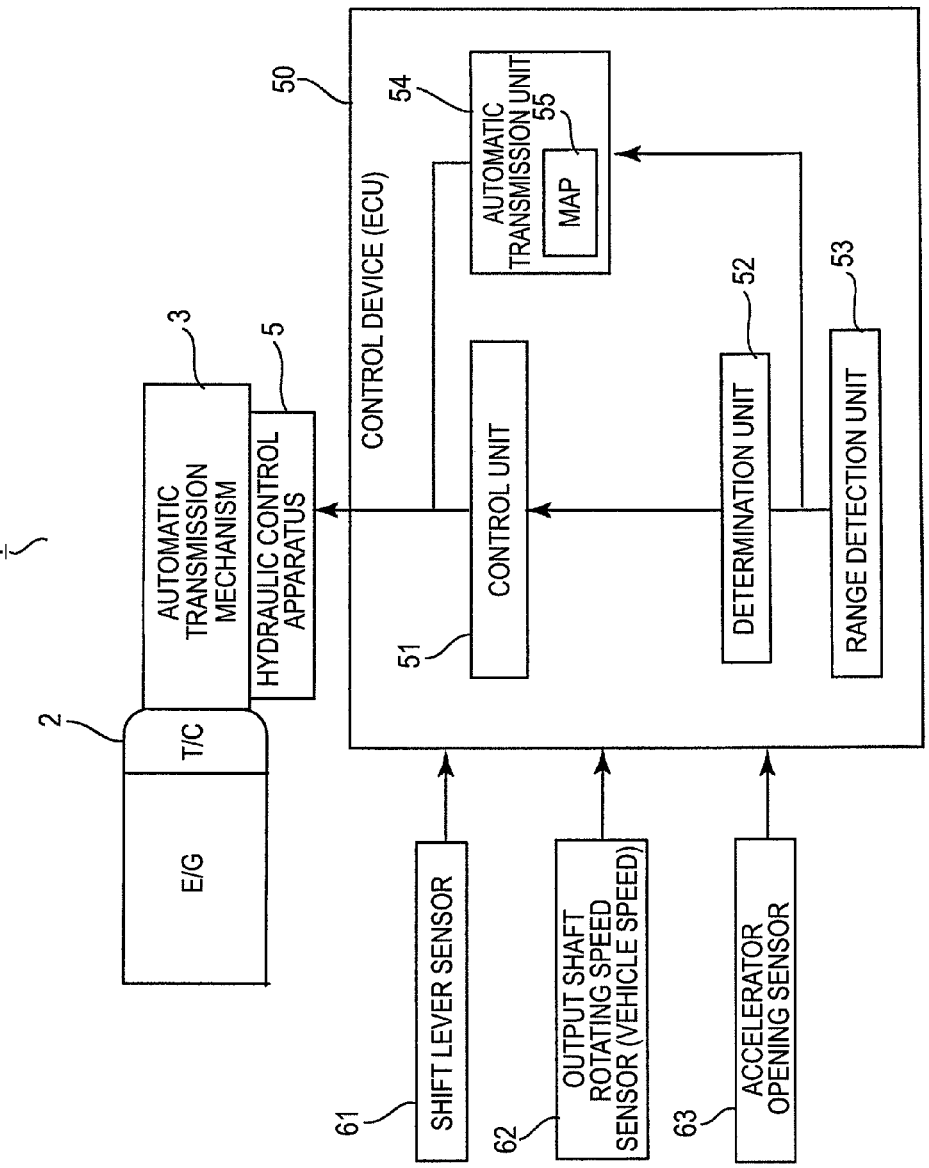
FIG. 4 is a block diagram of the hydraulic control apparatus of the automatic transmission.

As shown in FIG. 4, the control device (ECU) which controls the hydraulic control apparatus 5, including a control unit 51, a determination unit 52, to be described in detail hereafter, a range detection unit 53, an automatic transmission unit 54 which carries out a speed change based on a map 55, and the like, controls the hydraulic control apparatus 5 based on input signals from sensors such as a shift lever sensor 61, an output shift rotating speed sensor (a vehicle speed sensor) 62, and an accelerator opening sensor 63.

Detailed Configuration of Speed Change Control Portion In Hydraulic Control Apparatus Next, a description will be given, following FIG. 3, mainly of a portion which carries out a speed change control in the hydraulic control apparatus 5 according to the invention. In the embodiment, in order to describe a spool position of relay valves 21 to 25 to be described hereafter, the right half position shown in FIG. 3 will be referred to as a "right half position", and the left half position as a "left half position".

The hydraulic control apparatus 5 includes, as a whole, five (a plurality of) linear solenoid valves SLC1 (a first solenoid valve), SLC2 (a fourth solenoid valve), SLC3, SLC4, and SLB1 for directly supplying an output pressure adjusted as an engagement pressure (a hydraulic oil pressure) to each of a total of six (a plurality of) hydraulic servos 41 to 46; the hydraulic servo 41 of the clutch (a first frictional engagement element) C-1, the hydraulic servo 42 of the clutch (a second frictional engagement element) C-2, the hydraulic servo 43 of the clutch C-3, the hydraulic servo 44 of the clutch C-4, the hydraulic servo 45 of the brake B-1, and the hydraulic servo 46 of the brake B-2, and is configured including a solenoid valve S1, a first clutch apply relay valve 21, a second clutch apply relay valve 22, a first solenoid relay valve 23, a second solenoid relay valve 24, a C3-B2 apply relay valve 25, and the like, as portions which, as well as achieving a limp home function, switch the output pressure of the linear solenoid valve SLC3 to the hydraulic servo 43 of the clutch C-3 or the hydraulic servo 46 of the brake B-2.

The five linear solenoid valves SLC1, SLC2, SLC3, SLC4, and SLB1 are all normally closed type valves (which attain a non-output condition when de-energized), and each valve, having an input port and an output port, to be described hereafter, is configured in such a way that the input port and output port are disconnected when the valve is de-energized, and the output port attains the non-output condition, while they are caused to communicate when the valve is energized based on a command value from an unshown controller (an ECU), and the valve can increase an amount of the communication in accordance with the command value, that is, adjust a pressure input into the input port to an engagement pressure corresponding to the command value, and output it from the output port.

With the linear solenoid valve (first solenoid valve) SLC1, oil passages a1 and a2 into which the D range pressure $P_D$ is input are connected to an input port SLC1$a$ thereof, and an output port SLC1$b$ is connected to an input port 21$f$ of the first clutch apply relay valve 21, to be described in detail hereafter, via an oil passage c1.

With the linear solenoid valve SLC2, the oil passage a1 and an oil passage a3, into which the D range pressure $P_D$ is input, are connected to an input port SLC2$a$ thereof, and an output port SLC2$b$ is connected to an input port 21$i$ of the first clutch apply relay valve 21 via an oil passage d1 and an oil passage d2 branching from the oil passage d1, and connected to an oil chamber 23$r$2 of the first solenoid relay valve 23, to be described in detail hereafter, via an oil passage d5 branching from the oil passage d1.

With the linear solenoid valve SLC3, an oil passage b1 into which the line pressure $P_L$ is input is connected to an input port SLC3$a$ thereof, and an output port SLC3$b$ is connected to an input port 21$c$ of the first clutch apply relay valve 21, to be described in detail hereafter, via an oil passage e1.

With the linear solenoid valve SLC4, the oil passage a1 and an oil passage a4, into which the D range pressure $P_D$ is input, are connected to an input port SLC4$a$ thereof, and an output port SLC4$b$ is directly connected to the hydraulic servo 44 via an oil passage f.

With the linear solenoid valve SLB1, the oil passage a1 and an oil passage a5, into which the D range pressure $P_D$ is input, are connected to an input port SLB1$a$ thereof, and an output port SLB1$b$ is directly connected to the hydraulic servo 45 via an oil passage g.

The heretofore described five linear solenoid valves SLC1, SLC2, SLC3, SLC4, and SLB1, as they are all a normally closed type valve, as heretofore described, cannot output any more engagement pressure from their output ports SLC1$b$, SLC2$b$, SLC3$b$, SLC4$b$, and SLB1$b$ when a failure occurs. For this reason, no more engagement pressure is supplied to the hydraulic servos 41 to 46 from the five linear solenoid valves SLC1, SLC2, SLC3, SLC4, and SLB1.

The first clutch apply relay valve 21 which is one of the components for achieving the limp home function is configured in such a way that a spool 21$p$ is switched between a right half position (a normal time position) and a left half position (a failure time position) at a normal time and a failure time respectively. The first clutch apply relay valve 21 having the spool 21$p$ and a spring 21$s$ which biases the upper end side in the diagram of the spool 21$p$ downward (to the right half position side), an oil chamber 21$r$1 is formed on the upper end side of the spool 21$p$, and also, an oil chamber 21$r$2 which generates a differential pressure based on a difference in diameter (a difference in pressurized area) between the land portions of the spool 21$p$ is formed below the oil chamber 21$r$1, and an oil chamber 21$r$3 is formed on the lower end side. Also, nine ports, that is, an input port 21$a$, an output port 21$b$, the input port 21$c$, an input port 21$d$, an output port 21$e$, the input port 21$f$, an input port 21$g$, an output port 21$h$, and the input port 21$i$, are formed in the first clutch apply relay valve 21, in this order from the top in the diagram.

With the first clutch apply relay valve 21, in a condition in which the spool 21$p$ is switched to the right half position (normal time position), the input port 21$f$ and output port 21$e$ are caused to communicate, whereby the oil passage c1 which connects the input port 21$f$ and the output port SLC1$b$ of the linear solenoid valve SLC1, and an oil passage c2 which connects the output port 21$e$ and hydraulic servo 41, are caused to communicate. That is, the linear solenoid valve SLC1 is caused to communicate with the hydraulic servo 41 via the output port SLC1$b$, oil passage c1, input port 21$f$, output port 21$e$, and oil passage c2, and when an engagement pressure is output from the linear solenoid valve SLC1, attains a condition in which it can supply the engagement pressure to the hydraulic servo 41.

Also, in the same way, in the condition in which the spool 21$p$ is switched to the right half position, the input port 21$i$ and output port 21$h$ are caused to communicate, whereby the oil passages d2 and d1 which connect the input port 21$i$ and the output port SLC2$b$ of the linear solenoid valve SLC2, and an oil passage d3 which connects the output port 21$h$ and hydraulic servo 42, are caused to communicate. That is, the linear solenoid valve SLC2 is caused to communicate with the hydraulic servo 42 via the output port SLC2$b$, oil passages d1 and d2, input port 21$i$, output port 21$h$, and oil passage d3, and when an engagement pressure is output from the linear solenoid valve SLC2, attains a condition in which it can supply the engagement pressure to the hydraulic servo 42.

Also, in the same way, in the condition in which the spool 21$p$ is switched to the right half position, the input port 21$c$ and output port 21$b$ are caused to communicate, whereby an oil passage e1 which connects the input port 21$c$ and the output port SLC3$b$ of the linear solenoid valve SLC3, and an oil passage e2 which connects the output port 21$b$ and an input port 25$b$ of the C3-B2 apply relay valve 25, are caused to communicate. That is, the linear solenoid valve SLC3 is caused to communicate with the input port 25$b$ of the C3-B2 apply relay valve 25, to be described in detail hereafter, via an output port SLC$b$, the oil passage e1, the input port 21$c$, the output port 21$b$, and the oil passage e2, and when an engagement pressure is output from the linear solenoid valve SLC3, attains a condition in which it can supply the engagement pressure to the input port 25$b$ of the C3-B2 apply relay valve 25. As will be described in detail hereafter, when the engagement pressure is supplied to the input port 25$b$ of the C3-B2 apply relay valve 25, the engagement pressure is supplied to the hydraulic servo 43 via an output port 25$c$ and an oil passage e3 when a spool 25$p$ of the C3-B2 apply relay valve 25 is in the left half position, and supplied to the hydraulic servo 46 via an output port 25$a$ and an oil passage e4 when the spool 25$p$ is in the right half position.

As above, with the first clutch apply relay valve 21, in the condition in which the spool 21$p$ is switched to the right half position, the input port 21$f$ and output port 21$e$ of the first clutch apply relay valve 21 are caused to communicate, also, the input port 21$i$ and output port 21$h$ are caused to communicate, and the input port 21$c$ and output port 21$b$ are caused to communicate. These communications are disconnected when the spool 21$p$ is switched to the left half position, to be described next.

With the first clutch apply relay valve 21, in the condition in which the spool 21$p$ is switched to the left half position, the input port 21$d$ and output port 21$e$ are caused to communicate, whereby an oil passage (a low speed stage oil passage) a7 which connects the input port 21$d$ and an output port 22$c$ of the second clutch apply relay valve 22, to be described in detail hereafter, and the oil passage c2 connected to the output port 21$e$, are caused to communicate. That is, the output port 22$c$ of the second clutch apply relay valve 22 is caused to communicate with the hydraulic servo 41 via the oil passage a7, input port 21$d$, output port 21$e$, and oil passage c2, and attains a condition in which it can supply the engagement pressure from the output port 22$c$ to the hydraulic servo 41.

Also, in the same way, in the condition in which the spool 21$p$ is switched to the left half position, the input port 21$g$ and output port 21$h$ are caused to communicate, whereby an oil passage (a high speed stage oil passage) a8 which connects the input port 21$g$ and an output port 22$a$ of the second clutch apply relay valve 22, and the oil passage d3 connected to the output port 21*h*, are caused to communicate. That is, the output port 22*a* of the second clutch apply relay valve 22 is caused to communicate with the hydraulic servo 42 via the oil passage a8, input port 21*g*, output port 21*h*, and oil passage d3, and attains a condition in which it can supply the engagement pressure from the input port 22*a* to the hydraulic servo 42.

As above, the first clutch apply relay valve 21 is configured in such a way that, in the condition in which the spool 21*p* is switched to the left half position, the input port 21*d* and output port 21*e* are caused to communicate, and the input port 21*g* and output port 21*h* are caused to communicate. These communications are disconnected when the spool 21*p* is switched to the right half position.

With the first clutch apply relay valve 21, a signal pressure $P_2$ (a second signal pressure) is input into the oil chamber 21*r*1 at the normal time, as will be described in detail hereafter, and disconnected (caused not to be input) at the failure time, and also, the modulator pressure $P_{MOD}$ is always (regardless of whether at the normal time or failure time) input into the oil chamber 21*r*2, and the signal pressure (first signal pressure) $P_{SLT}$ is always input into the oil chamber 21*r*3 via an oil passage h, connected to an output port SLTb of the linear solenoid valve SLT, and an orifice 26. An arrangement is such that the signal pressure $P_{SLT}$ input into the oil chamber 21*r*3 rises in accordance with a throttle opening, or the like, unlike the signal pressure (modulator pressure $P_{MOD}$) input into the oil chamber 21*r*1 and the signal pressure (modulator pressure $P_{MOD}$) input into the oil chamber 21*r*2 being approximately constant. In the embodiment, as will be described in detail hereafter, an arrangement is such that, even when the signal pressure $P_{SLT}$ changes significantly within a short time at the normal time, the position of the spool 21*p* is prevented from switching unduly from the right half position (normal time position) to the left half position (failure time position).

The heretofore described first clutch apply relay valve 21, when the spool 21*p* is switched to the right half position (normal time position), attains the condition in which it can supply the engagement pressures generated in the linear solenoid valves SLC1, SLC2, and SLC3 to the hydraulic servos 41, 42, 43, and 46, while the first clutch apply relay valve 21, when the spool 21*p* is switched to the left half position (failure time position), by switching the oil passage, attains the condition in which it can supply the engagement pressure from the output port 22*c* of the second clutch apply relay valve 22 to the hydraulic servo 41, and supply the engagement pressure from the output port 22*a* to the hydraulic servo 42.

The second clutch apply relay valve (a low and high speed stage switching valve) 22 is configured in such a way that a spool 22*p* is switched between the left half position (low speed stage position) and right half position (high speed stage position) in a low speed side speed stage (the first forward speed stage to the fourth forward speed stage) and a high speed side speed stage (the fifth forward speed stage to the eighth forward speed stage) respectively, and furthermore, when a failure occurs, maintains the position at that point.

The second clutch apply relay valve 22 having the spool 22*p* and a spring 22*s* which biases the lower end side in the diagram of the spool 22*p* upward (to the left half position side), an oil chamber 22*r*1 is formed on the upper end side of the spool 22*p*, and an oil chamber 22*r*2 which generates a differential pressure based on a difference in diameter (a difference in pressurized area) between the land portions of the spool 22*p* is formed below the oil chamber 22*r*1. Also, a drain port q1, the output port 22*a*, an input port 22*b*, the output port 22*c*, a drain port q2, an input port 22*d*, and an output port 22*e* are formed in the second clutch apply relay valve 22, in this order from the top in the diagram.

With the second clutch apply relay valve 22, in a condition in which the spool 22*p* is switched to the left half position, the input port 22*b* and output port 22*c* are caused to communicate, and the D range pressure $P_D$ input via an oil passage a6 connected to the input port 22*b* is output approximately intact from the output port 22*c* as the engagement pressure. The engagement pressure is input into the input port 21*d* of the first clutch apply relay valve 21 via the oil passage a7, and furthermore, as well as being disconnected in the right half position (normal time position) of the spool 21*p* of the first clutch apply relay valve 21, is supplied to the hydraulic servo 41 via the output port 21*e*, connected to the input port 21*d*, and the oil passage c2, in the left half position (failure time position). The communication of the input port 22*b* and output port 22*c* of the second clutch apply relay valve 22 is disconnected when the spool 22*p* is switched to the right half position, and at this time, the engagement pressure accumulated in the output port 22*c* is discharged via the drain port q2.

Meanwhile, with the second clutch apply relay valve 22, in the condition in which the spool 22*p* is switched to the right half position, the input port 22*b* and output port 22*a* are caused to communicate, and the D range pressure $P_D$ input into the input port 22*b* via the oil passage a6 is output approximately intact from the output port 22*a* as the engagement pressure. The engagement pressure is input into the input port 21*g* of the first clutch apply relay valve 21 via the oil passage a8, and furthermore, as well as being disconnected when the spool 21*p* of the first clutch apply relay valve 21 is in the right half position (normal time position), is supplied to the hydraulic servo 42 via the output port 21*h*, caused to communicate with the input port 21*g*, and the oil passage d3 when the spool 21*p* is in the left half position (failure time position). The communication of the input port 22*b* and output port 22*a* of the second clutch apply relay valve 22 is disconnected when the spool 22*p* is switched to the left half position, and at this time, the engagement pressure accumulated in the output port 22*a* is discharged via the drain port q1.

One portion of the engagement pressure output from the output port SLC2*b* of the linear solenoid valve SLC2 is supplied to the oil chamber 22*r*1 of the second clutch apply relay valve 22, as the signal pressure, via the oil passages d1 and d2, and furthermore, via an oil passage d4 branching from the oil passage d2 to the left in the diagram, whereby the spool 22*p* placed in the left half position in the low speed stage is switched to the right half position.

Also, the modulator pressure $P_{MOD}$ is input into the input port 22*d*, and the modulator pressure $P_{MOD}$, as well as being disconnected when the spool 22*p* is switched to the left half position, is output approximately intact when the spool 22*p* is switched to the right half position from the output port 22*e* caused to communicate at this time, and furthermore, supplied to the oil chamber 22*r*2 via an oil passage a9 and an orifice 28. That is, when the spool 22*p* is in the right half position, the modulator pressure $P_{MOD}$ is input into the oil chamber 22*r*2 via the orifice 28, and the like, locking the spool 22*p* switched to the right half position (high speed stage position). For this reason, the spool 22*p* is maintained in the right half position even when the signal pressure is not supplied any longer to the oil chamber 22*r*1 at the failure time. When a travelling vehicle stops, the signal pressure supply to the oil chamber 22*r*2 is stopped by the ignition being turned off, meaning that the spool 22*p* is switched to the left half position (low speed stage position) by the biasing force of the spring 22*s*.

With the heretofore described second clutch apply relay valve 22, in the low speed stage (the first forward speed stage to the fourth forward speed stage) wherein the signal pressure is not input into the oil chamber 22r1, the spool 22p is switched to the left half position (low speed stage position) while, in the high speed stage (the fifth forward speed stage to the eighth forward speed stage) wherein the signal pressure is input into the oil chamber 22r1, the spool 22p is switched to the left half position, and when a failure occurs while travelling, maintains the position (the right half position or left half position) at that point. Then, when the spool 22p is switched to the left half position, the second clutch apply relay valve 22, in combination with the left half position (failure time position) of the spool 21p of the first clutch apply relay valve 21, supplies the D range pressure $P_D$ input into the input port 22b to the hydraulic servo 41 via the output port 22c, oil passages a7 and c2, and the like. Meanwhile, when the spool 22p is switched to the right half position, the second clutch apply relay valve 22, in combination with the left half position (failure time position) of the spool 21p of the first clutch apply relay valve 21, supplies the D range pressure $P_D$ input into the input port 22b to the hydraulic servo 42 via the output port 22a, oil passages a8 and d3, and the like. That is, the second clutch apply relay valve 22 switches an engagement pressure supply destination based on the D range pressure $P_D$ between the hydraulic servo 41 and hydraulic servo 42 depending on whether a travel stage when a failure occurs is the low speed stage (the first forward speed stage to the fourth forward speed stage) or the high speed stage (the fifth forward speed stage to the eighth forward speed stage).

The clutch (first frictional engagement element) C-1 engaged by the hydraulic servo 41 and the clutch (second frictional engagement element) C-2 engaged by the hydraulic servo 42 are frictional engagement elements which are not simultaneously engaged at the failure time, and a speed stage which can be achieved by engaging the clutch C-1 is a speed stage lower (larger in gear ratio) than a speed stage which can be achieved by engaging the clutch C-2.

In the embodiment, an oil pressure switching device is configured of the heretofore described first clutch apply relay valve 21, and the first clutch apply relay valve 21 supplies the engagement pressures output from the linear solenoid valves SLC1, SLC2, and SLC3 to the hydraulic servos 41, 42, 43, 46, and the like, at the normal time, while it supplies the D range pressure $P_D$ to the hydraulic servos 41 and 42, and the line pressure $P_L$ to the hydraulic servos 43 and 46, at the failure time. For this reason, when the invention is applied to, for example, an automatic transmission with four forward speed stages, or the like, that is, in a kind of case in which, as the number of forward travel stages is small, it is not necessary to distinguish between the low speed stage and high speed stage, and it is sufficient, at the failure time, to maintain a travel stage at that point, it is also possible to omit the second clutch apply relay valve 22.

The signal pressure supply to the oil chamber 21r1 of the first clutch apply relay valve 21 is carried out by three valves, that is, the solenoid valve S1, second solenoid relay valve 24, and first solenoid relay valve 23, which configure a signal output device. Of these, the solenoid valve (a third solenoid valve) S1 being a normally closed type valve, an input port S1a and an output port S1b, as well as being disconnected when the valve is de-energized, are caused to communicate when the valve is energized, and the solenoid valve S1 outputs the modulator pressure $P_{MOD}$ input into the input port S1a approximately intact from the output port S1b. An oil passage i1 is connected to the output port S1b, and the oil passage i1 is branched into an oil passage i2 extending downward in the diagram and an oil passage i3 extending upward in the diagram, of which the oil passage i2 is connected to an oil chamber 25r1 of the C3-B2 apply relay valve 25. That is, the solenoid valve S1 is also used as a valve which inputs a signal pressure $P_4$ (a fourth signal pressure) into the oil chamber 25r1 of the C3-B2 apply relay valve 25 and an oil chamber 24r1 of the second solenoid relay valve 24.

The C3-B2 apply relay valve 25 has the spool 25p and a spring 25s which biases the lower end side in the diagram of the spool 25p upward (to the left half position side), and the oil chamber 25r1 is formed on the upper end side of the spool 25p. Also, an output port 25a, the input port 25b, the output port 25c, and an input port 25d are formed in the C3-B2 apply relay valve 25. With the C3-B2 apply relay valve 25, the spool 25p thereof is switched to the left half position when the signal pressure is input into the oil chamber 25r1, and switched to the right half position when the signal pressure is not input.

With the C3-B2 apply relay valve 25, when the spool 22p is switched to the left half position, the input port 25b and output port 25c are caused to communicate. The input port 25b is connected to the output port 21b of the first clutch apply relay valve 21 via the oil passage e2. Herein, when the spool 21p of the first clutch apply relay valve 21 is switched to the right half position (normal time position), the output port 21b is connected to the output port SLC3b of the linear solenoid valve SLC3 via the output port 21c and oil passage e1. Consequently, at the normal time, as heretofore described, the engagement pressure generated in the linear solenoid valve SLC3 is supplied to the hydraulic servo 43 via the output port SLC3b, oil passage e1, input port 21c, output port 21b, oil passage e2, input port 25b, and output port 25c. As opposed to this, at the failure time, as the spool 22p of the second clutch apply relay valve 22 is switched to the left half position, the output port 21b and input port 21a are caused to communicate, and the line pressure $P_L$ passes through the oil passage b1, an oil passage b2 branching from the oil passage b1 downward in the diagram, the input port 21a, and the output port 21b, and subsequently, is supplied to the hydraulic servo 43 in the same way as at the normal time. That is, the engagement pressure generated in the linear solenoid valve SLC3 can be supplied at the normal time, while the line pressure $P_L$ is supplied at the failure time, to the hydraulic servo 43.

With the C3-B2 apply relay valve 25, when the spool 22p is switched to the right half position, the input port 25b and output port 25a are caused to communicate, whereby the engagement pressure input into the input port 25b is supplied to the hydraulic servo 46 via the oil passage e4. Furthermore, in the right half position, the input port 25d into which the R range pressure $P_{REV}$ is input and the output port 25c are caused to communicate, and the R range pressure $P_{REV}$ is supplied approximately intact to the hydraulic servo 43. When the solenoid valve S1 is turned on (an energized condition), the signal pressure is input into the oil chamber 25r1 of the C3-B2 apply relay valve 25, whereby the spool 25p is switched to the right half position. Meanwhile, when the solenoid valve S1 is off (a de-energized condition), including at the failure time, the signal pressure is not input into the oil chamber 25r1, and the spool 25p is switched to the left half position.

With the heretofore described C3-B2 apply relay valve 25, the spool 25p is switched to the right half position when the solenoid valve S1 is on, whereby, as well as the R range pressure $P_{REV}$ being supplied approximately intact to the hydraulic servo 43, the engagement pressure generated in the linear solenoid valve SLC3 can be supplied to the hydraulic servo 46.

The oil passage i3 branching from the oil passage i1 is connected to the oil chamber 24r1 of the second solenoid relay valve 24. The second solenoid relay valve (a second relay valve, a relay valve) 24 has a spool 24p and a spring 24s which biases the lower end side in the diagram of the spool 24p upward (to the left half position), and the oil chamber 24r1 is formed on the upper end side of the spool 24p. The second solenoid relay valve 24 has an input port 24b into which the modulator pressure $P_{MOD}$ is input and an output port 24a. With the second solenoid relay valve 24, on the solenoid valve S1 being turned on and the signal pressure output from the output port S1b thereof being input into the oil chamber 24r1 via the oil passage i1 and i3, the spool 24p is switched to the right half position. Because of this, the input port 24b is caused to communicate with the output port 24a, and the modulator pressure $P_{MOD}$ is input approximately intact into an input port 23a of the first solenoid relay valve 23 via the output port 24a and an oil passage j.

The first solenoid relay valve (a first relay valve, a relay valve) 23 has a spool 23p and a spring 23s which biases the lower end side in the diagram of the spool 23p upward (to the left half position side), an oil chamber 23r1 is formed on the upper end side of the spool 23p, and an oil chamber 23r2 which generates a differential pressure based on a difference in diameter (a difference in pressurized area) between the land portions of the spool 23p is formed below the oil chamber 23r1. Furthermore, the input port 23a, an output port 23b, and an input port 23c are formed in the first solenoid relay valve 23. One portion of the engagement pressure generated in the linear solenoid valve SLC1 is input into the oil chamber 23r1, as a signal pressure $P_3$ (a third signal pressure), via the output port SLC1b, the oil passage c1, and the oil passage c2 branching from the oil passage c1 to the right in the diagram. Meanwhile, the engagement pressure generated in the linear solenoid valve SLC2 is input into the oil chamber 23r2, as the signal pressure $P_3$ (third signal pressure), via the output port SLC2b, the oil passage d1, and the oil passage d5 branching from the oil passage d1 to the right in the diagram.

The first solenoid relay valve 23 is configured in such a way that the spool 23p is switched to a right half position (a supply position) when a total signal pressure input into the oil chambers 23r1 and 23r2 is equal to or greater than a predetermined threshold value (the spring force of the spring 23s), while it is switched to a left half position (a non-supply position) when the total is less than the threshold value. When the spool 23p is switched to the right half position, the input port 23c and output port 23b are caused to communicate, and the modulator pressure $P_{MOD}$ input into the input port 23c is output approximately intact to the output port 23b, and furthermore, input into the oil chamber 21r1 of the first clutch apply relay valve 21, as the signal pressure, via an oil passage k. Meanwhile, when the spool 23p is switched to the left half position, the input port 23a and output port 23b are caused to communicate, and at this time, when the modulator pressure $P_{MOD}$ is input into the input port 23a, the modulator pressure $P_{MOD}$ is input into the oil chamber 21r1 of the first clutch apply relay valve 21 via the output port 23b and oil passage k.

Herein, the solenoid valve S1, second solenoid relay valve 24, and first solenoid relay valve 23, configuring the signal output device, are configured in such a way that they can always output an approximately constant modulator pressure $P_{MOD}$ to the oil chamber 21r1 of the first clutch apply relay valve 21 as the signal pressure (second signal pressure $P_2$) at the normal time, while they do not output the signal pressure at the failure time.

Firstly, when the spool 23p of the first solenoid relay valve 23 is switched to the right half position, that is, at the normal time and when the signal pressure input into the oil chambers 23r1 and 23r2 of the first solenoid relay valve 23 is equal to or greater than a predetermined threshold value, the modulator pressure $P_{MOD}$ input into the input port 23c is always input into the oil chamber 21r1 of the first clutch apply relay valve 21 via the output port 23b and oil passage k.

Next, the cases in which the spool 23p of the first solenoid relay valve 23 is switched to the left half position are divided into the case in which the signal pressure is less than the predetermined threshold value and the case of the failure time. In the former case, for example, when the manual shift valve is switched from an N range to a D range, and the engagement pressure from the linear solenoid valve SLC1 rises, the signal pressure supplied from the linear solenoid valve SLC1 to the oil chamber 23r1 of the first solenoid relay valve 23 is low. In this case, as the signal pressure is not input into the other oil chamber 23r2, it may happen that the total signal pressure $P_3$ of the oil chamber 23r1 and oil chamber 23r2 is less than a predetermined threshold value (equal to or less than a predetermined value). At this time, the spool 23p of the first solenoid relay valve 23 is switched to the left half position, and there is a danger of the modulator pressure $P_{MOD}$ input into the input port 23c of the first solenoid relay valve 23 being disconnected.

Therefore, in the embodiment, as shown in FIG. 4, the determination unit 52 which determines whether or not the signal pressure $P_3$ is equal to or less than the predetermined value, and the control unit 51 which controls the solenoid valve S1 based on the determination, are provided in a control device 50.

The signal pressure $P_3$ is adjusted by the opening of the linear solenoid valve SLC1 and linear solenoid valve SLC, and the opening of the linear solenoid valve SLC1 and linear solenoid valve SLC is determined based on a control signal output based on various information input into the control device 50, that is, information from a shift lever sensor 61, an output shaft rotating speed sensor 62, an accelerator opening sensor 63, a range detection unit 53, and the like.

Figure 3:
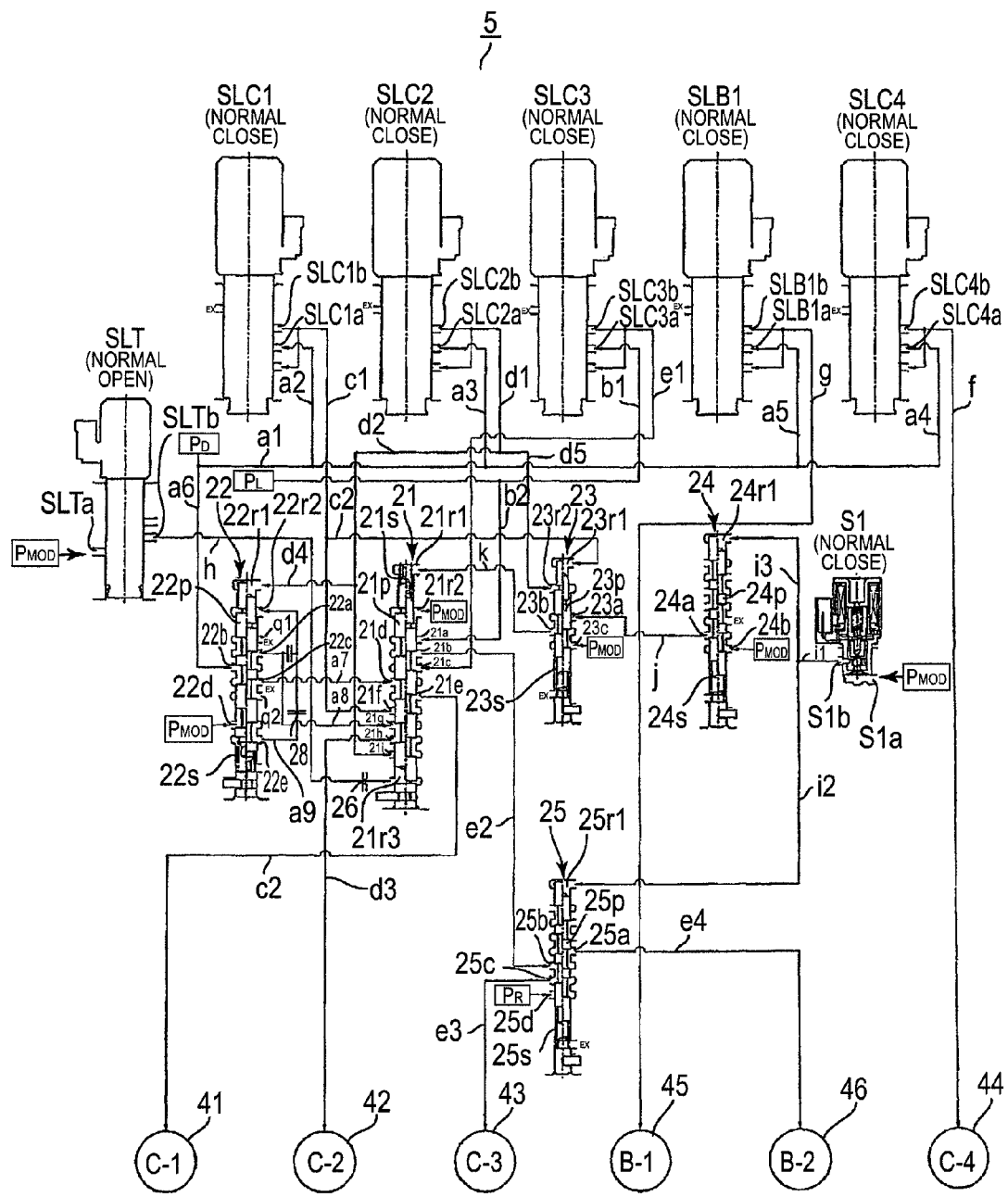
FIG. 3 is a circuit diagram showing a hydraulic control apparatus of an automatic transmission according to a first embodiment.

Therefore, the determination unit 52, when it determines based on the control signal that the signal pressure $P_3$ is equal to or less than the predetermined value, turns on the solenoid valve S1, shown in FIG. 3, via the control unit 51. Because of this, the modulator pressure $P_{MOD}$ input into the input port S1a of the solenoid valve S1 is input into the oil chamber 24r1 of the second solenoid relay valve 24 via the output port S1b and the oil passage i3, and the spool 24p of the second solenoid relay valve is switched to the right half position. Because of this, the modulator pressure $P_{MOD}$ input into the input port 24b is input into the oil chamber 21r1 of the first clutch apply relay valve 21, as the signal pressure $P_3$, via the output port 24a, oil passage j, input port 23a, output port 23b, and oil passage k, and the spool 21p is maintained in the right half position. As cases in which the signal pressure $P_3$ can reach the predetermined value or less, there are cases of a garage control and a neutral control. Therefore, the determination unit 52 may be arranged in such a way as to determine the garage control or neutral control in place of determining that the signal pressure $P_3$ has reached the predetermined value or less, and in these cases, turn on the solenoid valve S1.

As above, with the first clutch apply relay valve 21, at the normal time, the spool 21p is always maintained in the right half position (normal time position), including in a case too in which the signal pressure input into the oil chamber 23r2 of the first solenoid relay valve 23 is low.

As opposed to this, at the failure time, the solenoid valve S1 is turned off, disabling the signal pressure input into the oil chamber 24r1 of the second solenoid relay valve 24, and the linear solenoid valve SLC1 and linear solenoid valve SLC2 are turned off, disabling the signal pressure input into the oil chambers 23r1 and 23r2 of the first solenoid relay valve 23. For this reason, the spool 24p of the second solenoid relay valve 24 and the spool 23p of the first solenoid relay valve 23 are both switched to the left half position, stopping the signal pressure input therefrom into the oil chamber 21r1 of the first clutch apply relay valve 21. For this reason, the first clutch apply relay valve 21 is locked in the left half position (failure time position) by the signal pressure input into the oil chamber 21r3.

As above, with the first clutch apply relay valve 21, as the modulator pressure $P_{MOD}$ is always supplied to the oil chamber 21r1 thereof at the normal time, for example, even when a pressure supplied to the oil chamber 21r3 rises sharply, the spool 21p is reliably maintained in the right half position (normal time position). Meanwhile, at the failure time, as the supply of the modulator pressure $P_{MOD}$, supplied to the oil chamber 21r1 at the normal time reliably maintaining the spool 21p in the right half position, is stopped by the second solenoid relay valve 24, first solenoid relay valve 23, and the like, the first clutch apply relay valve 21 is locked in the left half position (failure time position).

Operation of Hydraulic Control Apparatus

Next, a description will be given of an operation of the hydraulic control apparatus 5 according to the embodiment. For example, on the ignition being turned on by the driver, a hydraulic control of the hydraulic control apparatus 5 is started. Firstly, when a selected position of the shift lever is in, for example, the P range or N range, the five linear solenoid valves SLC1, SLC2, SLC3, SLC4, and SLB1 which are of normally closed type are energized in accordance with an electrical command from the unshown controller, causing the input port and output port of each of the valves to communicate. Next, for example, on the engine being started, an oil pressure occurs by the oil pump (not shown) rotating based on a rotation of the engine, and the oil pressure is adjusted to the line pressure $P_L$ and modulator pressure $P_{MOD}$, and output, by the primary regulator valve and solenoid modulator valve respectively, as heretofore described, and, as well as the line pressure $P_L$ being input into the input port SLC3a of the linear solenoid valve SLC3 via an input port of the unshown manual shift valve and an oil passage, the modulator pressure $P_{MOD}$ is input into the input ports of the linear solenoid valve SLT, solenoid valve S1, first clutch apply relay valve 21, second clutch apply relay valve 22, first solenoid relay valve 23, and second solenoid relay valve 24.

Continuing, for example, on the driver changing the shift lever from the N range position to the D range position, the forward range pressure $P_D$ is output from the forward range pressure output port of the manual shift valve, and the forward range pressure $P_D$ is input into the four linear solenoid valves SLC1, SLC2, SLC4, and SLB1 via the oil passages a2 to a4, and the like. Subsequently, an engagement pressure is generated, and each clutch and each brake are disconnected by the engagement pressure, thereby executing a forward stage (the first forward speed stage to the eighth forward speed stage).

Herein, while travelling in the low speed stage (the first forward speed stage to the fourth forward speed stage), the first clutch apply relay valve 21 is switched to the right half position (normal time position) by the modulator pressure $P_{MOD}$ being input into the oil chamber 21r1 thereof, as the signal pressure, via the first solenoid relay valve 23 or via it and the second solenoid relay valve 24. Also, the second clutch apply relay valve 22, as the signal pressure is not input into the oil chamber 22r1 thereof, is switched to the left half position (low speed stage position).

Meanwhile, during a travel in the high speed stage (the fifth forward speed stage to the eighth forward speed stage), the first clutch apply relay valve 21 is switched to the right half position (normal time position) by the modulator pressure $P_{MOD}$ being input into the oil chamber 21r1 thereof, as the signal pressure, via the first solenoid relay valve 23 or via it and the second solenoid relay valve 24, in the same way as in the low speed stage. Also, the second clutch apply relay valve 22, as the signal pressure is input into the oil chamber 22r1 thereof from the linear solenoid valve SLC2, is switched to the right half position (high speed stage position).

Also, the C3-B2 apply relay valve 25 is switched to the right half position or left half position in accordance with the existence or otherwise of the signal pressure input into the oil chamber 25r1 thereof, that is, a turning on or off of the solenoid valve S1, respectively. As the solenoid valve S1 is turned on only at a time of the first forward speed, the spool 25p of the C3-B2 apply relay valve 25 is disposed in the left half position while travelling at a speed other than this, and at the failure time.

Operation at Solenoid all-Off Failure Time

Continuing, a description will be given of an operation at the failure time in the hydraulic control apparatus 5. At a normal travelling time in a condition in which the shift lever position is placed in the D range, all the solenoid valves (the five linear solenoid valve SLC1, SLC2, SLC3, SLC4, and SLB1, solenoid valve S1, and linear solenoid valve SLT) are de-energized due to, for example, a shutdown of the controller, a short circuit, or a wire breaking, and the solenoid valves other than the linear solenoid valve SLT, as they are of normally closed type, output no oil pressure, while the linear solenoid valve SLT, as it is of normally open type, outputs an oil pressure.

Firstly, when a failure occurs while travelling in the low speed stage (the first forward speed stage to the fourth forward speed stage), the respective spools 23p and 24p of the first solenoid relay valve 23 and second solenoid relay valve 24 are disposed in the left half position, meaning that the signal pressure supply to the oil chamber 21r1 of the first clutch apply relay valve 21 is stopped, thereby locking the first clutch apply relay valve 21 in the left half position (failure time position). Also, the second clutch apply relay valve 22 is maintained in the left half position which is the position in the low speed stage. Also, the C3-B2 apply relay valve 25, as the signal pressure supply to the oil chamber 25r1 thereof is disconnected, is locked in the left half position.

In this condition, the D range pressure $P_D$ is input into the hydraulic servo 41 via the oil passage a6, second clutch apply relay valve 22 input port 22b and output port 22c, oil passage a7, input port 21d, output port 21e, and oil passage c2, thereby securing the engagement pressure of the clutch C-1. Also, the line pressure $P_L$ is input into the hydraulic servo 43 via the oil passages b1 and b2, first clutch apply relay valve 21 input port 21a and output port 21b, oil passage e2, C3-B2 apply relay valve 25 input port 25b and output port 25c, and oil passage e3, thereby securing the engagement pressure of the clutch C-3. This condition is a condition of the third forward speed stage, as shown in FIG. 2. Consequently, for example, even while travelling in the fourth forward speed stage, the speed stage is switched to the third forward speed stage, and it is possible to continue traveling without receiving a large engagement shock, and subsequently, stop as appropriate.

Next, when a failure occurs while travelling in the high speed stage (the fifth forward speed stage to the eighth forward speed stage), with the first clutch apply relay valve 21 and C3-B2 apply relay valve 25, the respective spools 21p and 25p thereof are locked in the left half position, in the same way as in the low speed stage. Meanwhile, with the second clutch apply relay valve 22, the signal pressure which has been supplied to the oil chamber 22r1, switching the spool 22p to the right half position, is not supplied in the high speed stage, but the modulator pressure $P_{MOD}$ is being input into the oil chamber 22r2 via each of the input port 22d, output port 22e, oil passage a9, and orifice 28, meaning that the spool 22p is maintained in the right half position.

Because of this, the D range pressure $P_D$ is input into the hydraulic servo 42 via the oil passage a6, input port 22b, output port 22a, oil passage a8, first clutch apply relay valve 21 input port 21g and output port 21h, and oil passage d3. Because of this, the engagement pressure of the clutch C2 is secured. Along with a switching of the second clutch apply relay valve 22 from the left half position to the right half position, the engagement pressure supply to the hydraulic servo 41 is disconnected, and the line pressure $P_L$ is supplied to the hydraulic servo 43, in the same way as in the low speed stage. This condition is a condition of the seventh forward speed stage, as shown in FIG. 2. Consequently, for example, even while travelling at high speed in the eighth forward speed stage, the speed stage is switched to the seventh forward speed stage, and it is possible to continue travelling without receiving a large engagement shock, and subsequently, stop as appropriate.

On the vehicle being stopped and the ignition being turned off, with the second clutch apply relay valve 22, as the oil pressure supply to the oil chamber 22r2 is stopped, the spool 22p is switched to the left half position. This corresponds to the condition of the third forward speed stage. For this reason, not only when a failure occurs in the low speed stage, but also when a failure occurs in the high speed stage, the so-called limp home function, wherein the vehicle starts moving again after it has once stopped, is possible.

As above, according to the embodiment, with the first clutch apply relay valve 21 which is switched to the right half position at the normal time and to the left half position at the failure time, even when the engagement pressure generated in the linear solenoid valve SLC1 or linear solenoid valve SLC2 is low, the modulator pressure $P_{MOD}$ is always input into the oil chamber 21r1 of the first clutch apply relay valve 21 from the first solenoid relay valve 23 or second solenoid relay valve 24 at the normal time, meaning that, even when the signal pressure $P_{SLT}$ of the linear solenoid valve SLT input into the oil chamber 21r3 rises sharply, it is possible to reliably maintain the spool 21p in the right half position (normal time position), and it is possible to prevent a malfunction such that the spool 21p is switched to the left half position (failure time position) at the normal time. Herein, for example, the low engagement pressure of the linear solenoid valve SLC1 occurs immediately after a pressure supply to the linear solenoid valve SLC1 has been started during the neutral control, or the like. In the above description, the modulator pressure $P_{MOD}$ is supplied to the oil chamber 21r1 of the first clutch apply relay valve 21 via the first solenoid relay valve 23 or second solenoid relay valve 24, but an arrangement may be such that the line pressure $P_L$ is supplied in place of the modulator pressure $P_{MOD}$.

Also, for example, in order to prevent a malfunction of the first clutch apply relay valve 21 at the normal time, it is also possible to control the signal pressure $P_{SLT}$ of the linear solenoid valve SLT input into the oil chamber 21r3 of the first clutch apply relay valve 21, but the control in this case is complex. According to the embodiment, it is possible to reliably prevent the malfunction of the first clutch apply relay valve 21 without a need for this kind of complex control, and with a simple configuration using valves. Along with this, with the hydraulic control apparatus 5, it is possible to realize the limp home function without involving a complex control of the linear solenoid valve SLT.

Also, the hydraulic control apparatus 5 uses the linear solenoid valves SLC1, SLC2, SLC3, SLC4, and SLB1, linear solenoid valve SLT, and solenoid valve S1 as solenoid valves needing to be energized, but of these, only the linear solenoid valve SLT is a normally open type valve, and the remainder are all normally closed type valves. At least one solenoid valve which, when de-energized, can generate an oil pressure is necessary in order to achieve the limp home function. With the hydraulic control apparatus 5, as it has only one normally open type solenoid valve, it is possible to reduce power consumption.

Second Embodiment

Figure 5:
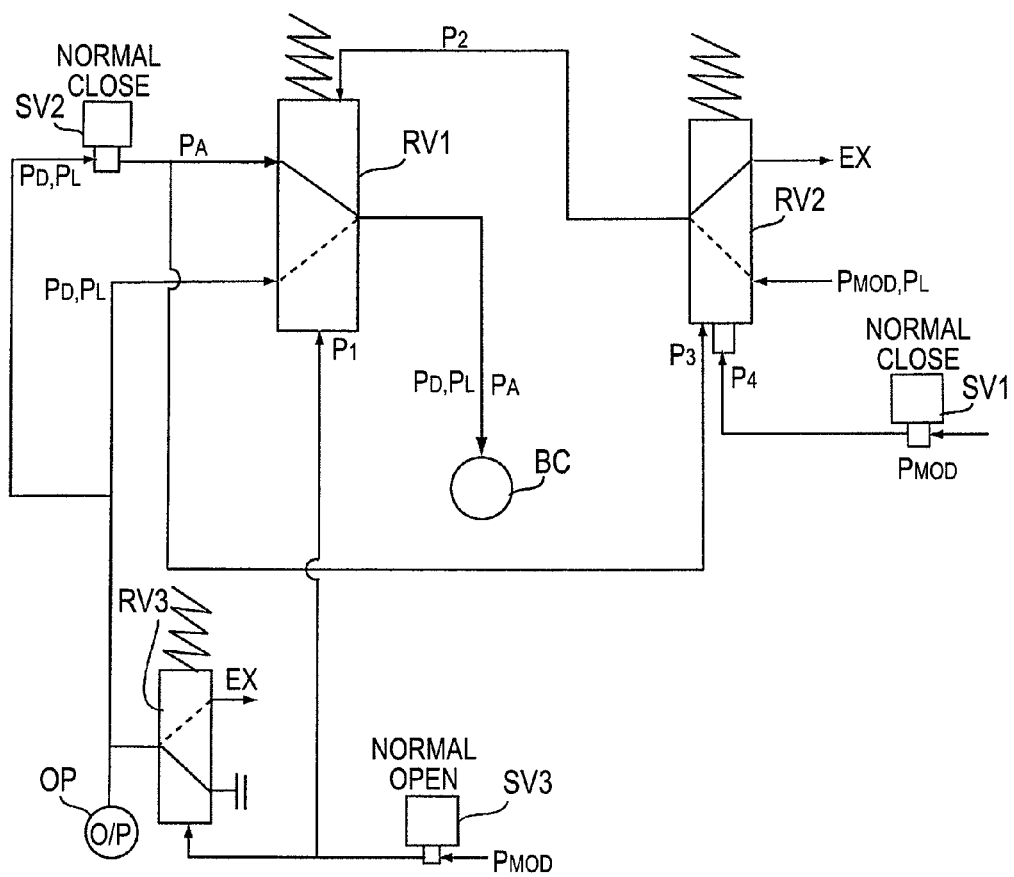
FIG. 5 is a circuit diagram showing a hydraulic control apparatus of an automatic transmission according to a second embodiment.

FIG. 5 shows a hydraulic control apparatus of a second embodiment according to the invention. The hydraulic control apparatus, including a relay valve RV1, a relay valve RV2, a relay valve RV3, a solenoid valve SV1, a solenoid valve SV2, a solenoid valve SV3, and an oil pump OP, is configured in such a way as to be able to supply an oil pressure to a supply destination BC, regardless of whether at the normal time or failure time. The two relay valves RV1 and RV2 are both switched between two positions depending on whether at the normal time or failure time. Of the three solenoid valves SV1, SV2, and SV3, the solenoid valves SV1 and SV2 are of normally closed type, and the remaining solenoid valve SV3 is of normally open type.

Herein, a description will be given of a correspondence relationship with the hydraulic control apparatus 5 in FIG. 3. The relay valve (an oil pressure switching device) RV1 in FIG. 5 corresponds to the first clutch apply relay valve 21, or the first clutch apply relay valve 21 and second clutch apply relay valve 22, in FIG. 3, and in the same way, the relay valve RV2 corresponds to the first solenoid relay valve 23 and second solenoid relay valve 24, the solenoid valve SV1 to the solenoid valve S1, the solenoid valve SV2 to the linear solenoid valves SLC1, SLC2, SLC3, and the like, the solenoid valve SV3 to the linear solenoid valve SLT, and the supply destination BC to the hydraulic servos 41, 42, 43, 46, and the like. Also, the solenoid valve SV1 and relay valve RV2 correspond to the signal output device.

Also, a pressure $P_4$ supplied to the relay valve RV1 from the solenoid valve SV2 corresponds to the engagement pressures output from the linear solenoid valves SLC1, SLC2, and SLC3, a pressure $P_4$ supplied to the relay valve RV2 from the solenoid valve SV1 to the signal pressure (fourth signal pressure) input into the oil chamber 24r1 of the second solenoid relay valve 24 from the solenoid valve S1, a pressure $P_3$ input into the relay valve RV2 from the solenoid valve SV2 to the signal pressure (third signal pressure) input into the oil chambers 23r1 and 23r2 of the first solenoid relay valve 23 from the linear solenoid valve SLC1 and the linear solenoid valve SLC2, a pressure $P_2$ input into the relay valve RV1 from the relay valve RV2 to the second signal pressure (modulator pressure $P_{MOD}$) supplied to the oil chamber 21r1 of the first clutch apply relay valve 21 from the first solenoid relay valve 23 or second solenoid relay valve 24, and a pressure $P_1$ input into the relay valve RV1 from the solenoid valve SV3 to the first signal pressure ($P_{SLT}$) supplied to the oil chamber 21r3 of the first clutch apply relay valve 21 from the linear solenoid valve SLT. The pressure $P_2$ and pressure $P_1$ input into the relay valve RV1 are opposed pressures.

The modulator pressure $P_{MOD}$ is input into the solenoid valves SV1 and SV3. Also, the line pressure $P_L$ or D range pressure $P_D$ is input into the solenoid valve SV2. The line pressure $P_L$ or D range pressure $P_D$ is such that a pressure output from the oil pump OP is adjusted by the relay valve RV3 which is switched by the pressure $P_1$ output from the solenoid valve SV3.

In FIG. 5, at the normal time, based on the pressures $P_3$ and $P_4$ input into the relay valve RV2, the modulator pressure $P_{MOD}$ or line pressure $P_L$ is always input into the relay valve RV1, as the signal pressure $P_2$, via the relay valve RV2, and the relay valve RV1 is disposed in the normal time position. In the normal time position of the relay valve RV1, the pressure $P_A$ output from the solenoid valve SV2 is supplied to the supply destination BC via the relay valve RV1. The RV1 disposed in the normal time position, as the modulator pressure $P_{MOD}$ or line pressure $P_L$ is input as the signal pressure $P_2$ at this time, reliably maintains the normal time position without being unduly switched to the failure time position even when the signal pressure $P_1$ which is the opposed pressure increases suddenly.

Meanwhile, at the failure time, as the modulator pressure $P_{MOD}$ or line pressure $P_L$ input as the signal pressure $P_2$ at the normal time is drained (discharged), the relay valve RV1 is switched to the failure time position by the signal pressure $P_1$. Because of this, the D range pressure $P_D$ or line pressure $P_L$ is supplied to the supply destination BC via the relay valve RV1.

As above, as the relay valve RV1 is maintained in the normal time position by the modulator pressure $P_{MOD}$ or line pressure $P_L$ at the normal time, it is possible to reliably prevent a malfunction of switching to the failure time position, while, as the supply of the modulator pressure $P_{MOD}$ or line pressure $P_L$ can be stopped at the failure time, it is possible to switch to the failure time position without problem.

In the heretofore described first embodiment and second embodiment, a description has been given with a case in which the hydraulic control apparatus 5 of the automatic transmission is applied to the automatic transmission 1, which achieves eight forward speed stages and one reverse stage, as one example, but the invention, not being limited to this, may be applied to an automatic transmission which achieves six forward speed stages, and can be applied to any automatic transmission, in particular, provided that it is an automatic transmission which carries out a multi-stage transmission.

The hydraulic control apparatus of the automatic transmission according to the invention can be used as a hydraulic control apparatus of an automatic transmission mounted in a car, a truck, or the like, and in particular, is suitable for use in a hydraulic control apparatus of an automatic transmission of which it is required to achieve a prevention of a valve which is switched between the normal time position and failure time position from being switched to the failure position at the normal time, with a simple configuration eliminating a need for a complex control.

What is claimed is:

1. A hydraulic control apparatus of an automatic transmission which can supply a hydraulic oil pressure to at least one of hydraulic servos of a plurality of frictional engagement elements at a failure time when a de-energized condition is attained, comprising:
 a normally closed type first solenoid valve which can generate the hydraulic oil pressure;
 a normally open type second solenoid valve which outputs a first signal pressure for adjusting and controlling an oil pressure generated by an oil pump to a line pressure;
 a signal output device which outputs the line pressure or a modulator pressure, wherein the line pressure is reduced to a certain pressure, as a second signal pressure at a normal time, and causes the second signal pressure not to be output at the failure time; and
 an oil pressure switching device which, being switchable between a normal time position in which the hydraulic oil pressure from the first solenoid valve can be supplied to the hydraulic servo, and a failure time position in which the line pressure is supplied to the hydraulic servo, is switched to the normal time position by the first signal pressure and second signal pressure, which are input opposed to each other, being input, and switched to the failure time position by the first signal pressure being input and the second signal pressure not being input.

2. The hydraulic control apparatus of the automatic transmission according to claim 1, wherein
 the signal output device includes:
 a third solenoid valve which outputs a fourth signal pressure;
 a second relay valve which, as well as being supplied with the line pressure or modulator pressure, is switched between a condition in which it causes the line pressure or modulator pressure to be output, and a condition in which it causes the line pressure or modulator pressure not to be output, in accordance with the fourth signal pressure; and
 a first relay valve which, as well as being supplied with the line pressure or modulator pressure, is switched to a supply position in which it outputs the line pressure or modulator pressure as the second signal pressure by a third signal pressure based on the hydraulic oil pressure being input, and switched to a non-supply position in which it causes the line pressure or modulator pressure not to be output by the third signal pressure not being input, and outputs the line pressure or modulator pressure, supplied from the second relay valve, as the second signal pressure.

3. The hydraulic control apparatus of the automatic transmission according to claim 2, comprising:
 a determination unit which determines that the third signal pressure has reached a predetermined value or less; and
 a control unit which, when the determination unit determines that the third signal pressure is equal to or less than the predetermined value, turns on the third solenoid valve so as to input the fourth signal pressure into the second relay valve, and input the line pressure or modulator pressure supplied to the second relay valve into the first relay valve.

4. The hydraulic control apparatus of the automatic transmission according to claim 1, wherein
 the automatic transmission includes:
 the plurality of frictional engagement elements including a first frictional engagement element and a second friction engagement element, and
 the hydraulic control apparatus includes:
 a normally closed type fourth solenoid valve which can generate a hydraulic oil pressure which is supplied to the hydraulic servo of the second frictional engagement element; and
 a low and high speed stage switching valve which, as well as being switched between a low speed stage position in which it outputs the supplied line pressure to a low speed stage oil passage, and a high speed stage position in which it outputs the supplied line pressure to a high speed stage oil passage, when the failure occurs, maintains the position at that point, wherein the first solenoid valve generates a hydraulic oil pressure which is supplied to the hydraulic servo of the first frictional engagement element, and the oil pressure switching device has an oil pressure switching valve which is switchable between the normal time position in which it can supply the hydraulic oil pressure from the first solenoid valve to the hydraulic servo of the first frictional engagement element, and supply the hydraulic oil pressure from the fourth solenoid valve to the hydraulic servo of the second frictional engagement element, and the failure time position in which it can supply the line pressure input from the low speed stage oil passage to the hydraulic servo of the first frictional engagement element, and supply the line pressure input from the high speed stage oil passage to the hydraulic servo of the second frictional engagement element.

* * * * *